UNITED STATES PATENT OFFICE.

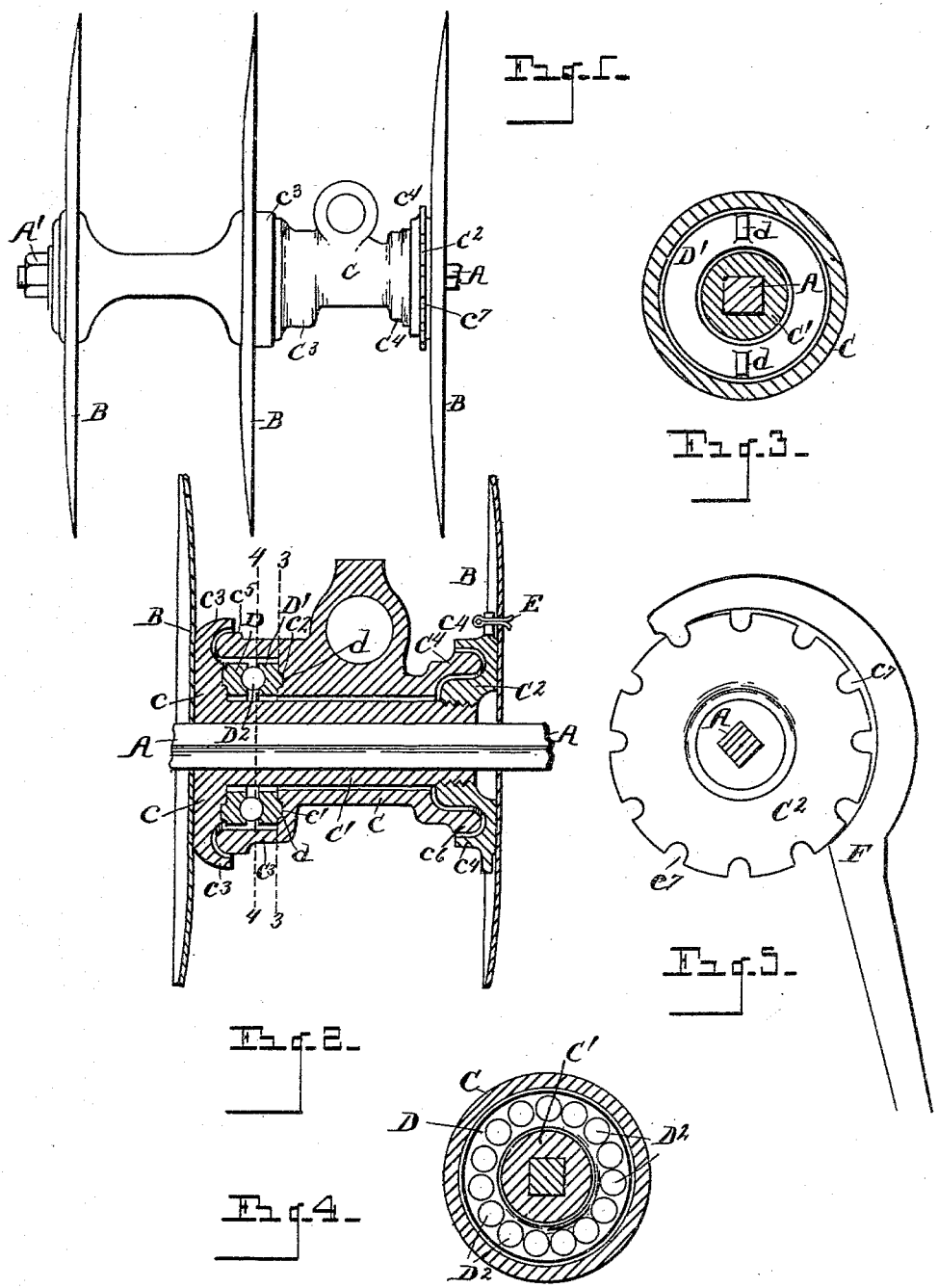

ELIJAH A. OVENSHIRE, OF DETROIT, MICHIGAN, ASSIGNOR TO THE AMERICAN HARROW COMPANY, OF SAME PLACE.

BALL-BEARING FOR DISK HARROWS.

SPECIFICATION forming part of Letters Patent No. 545,210, dated August 27, 1895.

Application filed May 13, 1895. Serial No. 549,071. (No model.)

*To all whom it may concern:*

Be it known that I, ELIJAH A. OVENSHIRE, a citizen of the United States, residing at Detroit, county of Wayne, State of Michigan, have invented a certain new and useful Improvement in Ball-Bearings; and I declare the following to be a full, clear, and exact description of the invention, such as will enable others skilled in the art to which it appertains to make and use the same, reference being had to the accompanying drawings, which form a part of this specification.

My invention relates to an improved ball-bearing, the same being especially adapted for use on disk harrows and to receive the end strain longitudinally of the axle thereof.

It consists of the construction, combination, and arrangement of devices and appliances hereinafter described and claimed, and illustrated in the accompanying drawings, in which my invention is illustrated in connection with a disk harrow, and in which—

Figure 1 is a partial plan view embodying my invention. Fig. 2 is a partial horizontal section of the same. Fig. 3 is a sectional view on the line 3 3, Fig. 2. Fig. 4 is a sectional view on the line 4 4, Fig. 2. Fig. 5 is a detail view of the nut $C^2$ in elevation.

It is well understood that in disk harrows especially there is a good deal of end strain, or a strain in a direction longitudinally of the axle toward the inner extremity thereof, owing to the pitch of the disks located thereupon. My invention is designed more especially to provide a ball-bearing to receive this end strain when the device is in operation.

I carry out my invention as follows:

A represents an axle of a disk harrow, and B represents the disks engaged thereupon.

A' is a nut on the end of the axle.

My improved ball-bearing consists essentially of a hollow hub C, within which is engaged a skein C' provided with a flange $c$ at one end thereof engaged with an adjacent disk.

$C^2$ is a washer or nut having an adjustable engagement upon the skein C' at the opposite end thereof, and also an adjustable engagement with an adjacent disk.

The skein is constructed with a squared orifice to receive the similarly-formed axle. The disks are also constructed with squared orifices to receive the axle. By this means it is evident the disks and skein will not turn upon the axle.

Within one end of the hub C and about the corresponding end of the skein C', I locate a couple of rings D D', concaved or otherwise dished on their adjacent faces, the skein being sleeved through said rings.

$D^2$ denotes a series of balls located between said rings. The rings D D' are each constructed with lugs $d$ on their outer faces to engage in corresponding orifices $c'$ and $c^2$ in the adjacent parts of the device—viz., in the flange of the skein and in the hub to prevent the rings from turning upon the skein. The end of the hub C adjacent to the rings D D' is enlarged to receive said rings and the balls therebetween, a flange $C^3$ on the end of the hub projecting over said rings, as shown. The end of the hub C adjacent to the nut or washer $C^2$ is enlarged to receive the inner end of the washer, a flange $C^4$ on the adjacent end of the hub projecting over the inner end of the washer, as shown.

The adjacent edges of the rings D D' are preferably separated, as shown, so that any dirt that might possibly enter the bearing would readily work out of the rings of its own gravity as the balls are rotated in the operation of the machine. To effectually prevent dirt working into the bearing, however, I contemplate forming the flange $c$ of the skein with an inwardly-projecting flange $c^3$, and the washer $C^2$ with an inwardly-projecting flange $c^4$, the outer extremities of the flanges $C^3$ and $C^4$ being raised on their peripheries, as shown at $c^5$ and $c^6$. By this construction dirt will be very effectually excluded from the ball-bearing and from connection of the hub with the washer $C^2$ altogether.

It will be apparent that the strain of the disks toward the inner end of the axle will be communicated longitudinally of the axle upon the rings D D' with the balls intervening. This operation of the ball-bearing is obviously quite different from that of ordinary ball-bearings where the strain is vertical, inasmuch as there is no vertical strain whatever upon the ball-bearings embodied in my invention, the rings D D' with the balls intervening having no contact with the axle at all, nor do the balls have any contact with the skein. By holding the rings D D' in fixed engagement, the one with the hub C and the other with the skein C', it is obvious that the ring D' remains stationary while the ring D rotates with the skein.

The rings D D' and the balls are preferably made of chilled metal or steel.

It will be seen that to repair the ball-bearing all that will be required will be to simply renew the rings only. No wear comes on the inner or outer peripheries of the rings, the wear of the hub C coming centrally upon the skein. The rings are thus relieved from the draft-strain and only take the end strain, as above described.

As hereinbefore stated, the washer $C^2$ has an adjustable engagement with the skein. This I accomplish by threading the adjacent end of the skein and by correspondingly threading the adjacent portion of said washer, as shown. By this means the washer $C^2$ may very readily be adjusted upon the skein, as may be desired—as, for example, to compensate for any wear upon the rings D D'. To permit of this adjustment of the washer upon the skein it must also have an adjustable engagement with the disk, as above noted. For this purpose I prefer to construct the washer with a series of peripheral recesses $c^7$, and to engage the washer with said disk by means of a suitable key E located in one of said recesses and passed through the disk, as shown. By means of a suitable wrench F the washer may thus be readily adjusted upon the skein and then keyed to the disk to hold it in engagement with the disk and in adjusted position upon the skein.

What I claim as my invention is—

1. In a ball bearing for disk harrows and analogous devices, the combination of an axle, a skein, a hub located about said skein, rings D D' located about one end of the skein between the skein and hub, and balls located between said rings, to receive the end strain, substantially as set forth.

2. A ball bearing for disk harrows and analogous devices having in combination an axle, a skein, a nut or washer engaged upon one end of the skein, a hub C located about said skein, rings D D' located in vertical planes about the skein between the hub and the skein, one of said rings having a fixed engagement with the hub and the other ring having a fixed engagement with the skein, and balls between the adjacent faces of said rings to receive the end strain, substantially as set forth.

3. A ball bearing for disk harrows and analogous devices having in combination an axle, a skein, a nut or washer engaged upon one end of the skein, a hub C located about said skein, rings D D' located in vertical planes about the skein between the hub and the skein, one of said rings having a fixed engagement with the hub and the other ring having a fixed engagement with the skein, and balls between the adjacent faces of said rings to receive the end strain, said nut or washer having an adjustable engagement with the skein and with an adjacent disk, substantially as set forth.

4. A ball bearing for disk harrows and analogous devices having in combination an axle, a skein, a nut or washer engaged upon one end of the skein, a hub C located about said skein, rings D D' located about the skein between the hub and the skein, one of said rings having a fixed engagement with the hub and the other ring having a fixed engagement with the skein, and balls between the adjacent faces of said rings to receive the end strain, said nut or washer having an adjustable engagement with the skein and with an adjacent disk, and said skein and washer each provided with a protecting flange projecting inwardly over the adjacent extremity of the hub, substantially as set forth.

5. A ball bearing for disk harrows and analogous devices having in combination an axle, a skein, a nut or washer engaged upon one end of the skein, a hub C located about said skein, rings D D' located about the skein between the hub and the skein, and balls between the adjacent faces of said rings to receive the end strain, substantially as set forth.

In testimony whereof I sign this specification in the presence of two witnesses.

ELIJAH A. OVENSHIRE.

Witnesses:
N. S. WRIGHT,
M. A. MARTIN.